Organic Phase: 0.2 M β-Diketone
0.1 M TOPO in Benzene

1. Heptafluorodimethyloctanedione
2. Pentafluorodimethylheptanedione
3. Trifluorodimethylhexanedione
4. Dibenzoylmethane
5. Tetramethylheptanedione

United States Patent Office 3,793,433
Patented Feb. 19, 1974

3,793,433
EXTRACTION OF LITHIUM FROM NEUTRAL BRINES USING A BETA DIKETONE AND TRIOCTYLPHOSPHINE OXIDE
Forest G. Seeley and Willis H. Baldwin, Oak Ridge, Tenn., assignors to the United States of America as represented by the United States Atomic Energy Commission
Filed July 23, 1971, Ser. No. 165,601
Int. Cl. B01d 11/04; C01d 11/02
U.S. Cl. 423—181     1 Claim

ABSTRACT OF THE DISCLOSURE

The present invention relates to a method of extracting lithium values from neutral or near-neutral aqueous brines by the use of a solvent extraction scheme where the effective extractant is provided by the synergistic action of (1) β-ketone and analogues thereof in which the β carbon atom of said β-ketone or analogue is joined to at least two halogen atoms, and (2) a Lewis-base solvating ligand more basic than water.

Figure 1:
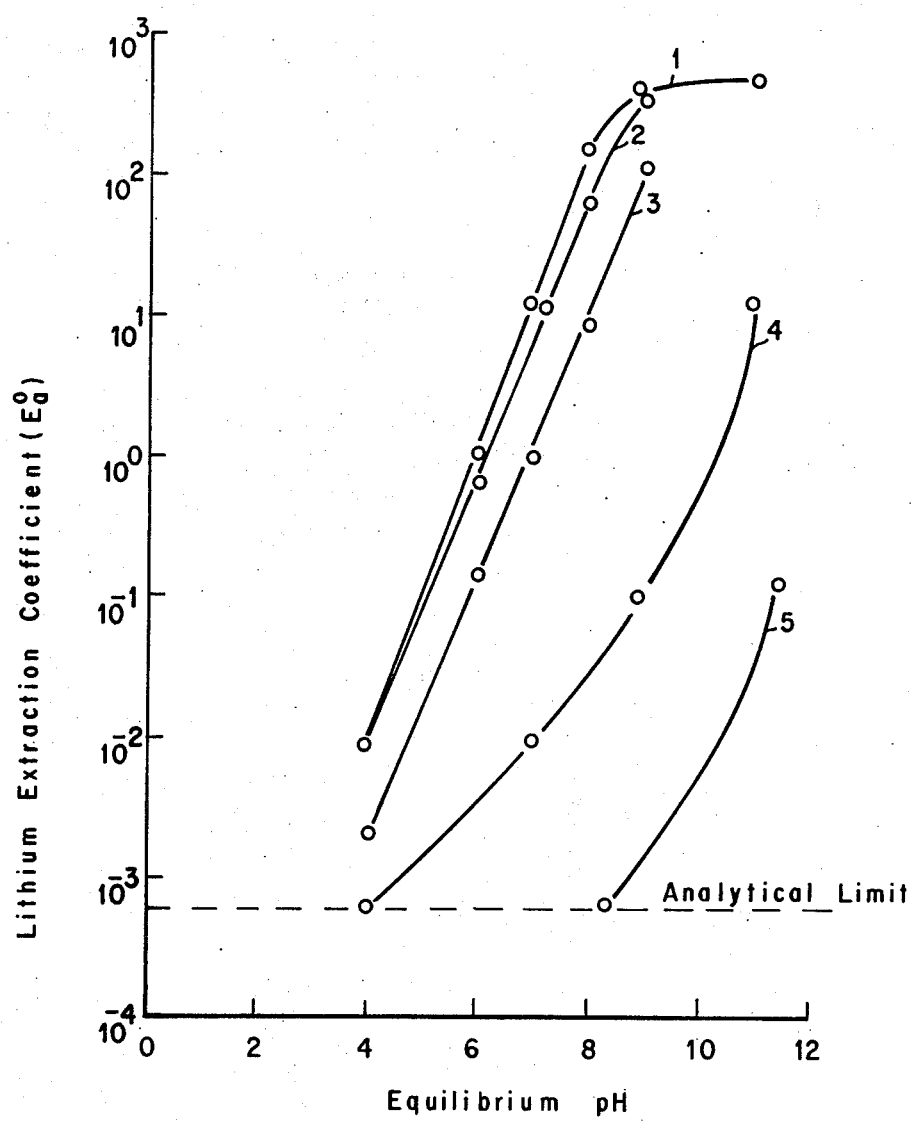

The invention described herein was made in the course of, or under, a contract with the U.S. Atomic Energy Commission.

PRIOR ART

The separation of lithium and other alkali metals from aqueous solutions is known from U.S. Pat. No. 3,479,147 and from an article entitled "Solvent Extraction of Lithium," Journal of Inorganic Chemistry, vol. 30, 1968, pp. 2807-2821, wherein lithium is separated from aqueous basic solutions having a pH in the range 11-14 by contacting said solution with a substantially water-insoluble phase containing (1) a chelating agent selected from β-diketones and analogues thereof wherein the oxygen atoms in the selected β-diketone may be replaced with nitrogen, phosphorous, or sulfur atoms and (2) a Lewis-base solvating ligand which is more basic than water selected from the group consisting of amines and organophosphorous compounds represented by the formula

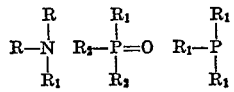

where R is selected from hydrogen, alkyl, and aryl radicals; $R_1$ is selected from alkyl and aryl radicals; and $R_2$ is selected from alkyl, aryl, alkoxy, and aralkoxy radicals, and sulfur analogous of alkoxy and aralkoxy radicals. The mechanism by which solvent extraction of lithium is achieved involves the formation of some form of adduct between a lithium chelate of a suitable β-diketone and a Lewis-base solvating ligand. Although quite high lithium extraction coefficients and significant separation from other alkali metals have been achieved by this method, a relatively high pH for the formation of the desired lithium chelate is necessary. Extraction of lithium from neutral or near-neutral salt solutions (having a pH in the range 6-9) is impractically low with the disclosed class of β-diketones.

SUMMARY OF THE INVENTION

The present invention extends the solvent extraction technology of lithium to enable separation of lithium and other alkali metals from neutral or near-neutral aqueous brines (those having a pH in the range 6-9) and is based on the discovery that a selected class of halogenated, preferably fluorinated, β-diketones dissolved in a defined organic phase have the capacity to selectively and quantitatively extract lithium from neutral brines, typified by seawater concentrates, in a liquid-liquid solvent extraction scheme.

The organic phase comprises (1) a selected class of fluorinated β-diketones and defined analogous thereof, (2) a Lewis-base solvating ligand which is more basic than water, and (3) an organic solvent or diluent for (1) and (2).

The effective chelating agent for practicing this invention is selected from a halogenated, preferably fluorinated, β-diketone which is sufficiently acidic to allow an aqueous solution of alkali metals which has been contacted with an organic phase containing a selected β-diketone to display buffering and hence chelating action at a pH in the range 4-8. In other words, in a plot of pH vs. amount of base added to an aqueous phase containing dissolved lithium values, a point of inflection, indicating complete chelating, will be noted at a pH in the range 8-10 for these β-diketones which are effective in removing lithium from neutral or near-neutral brine solutions. The effective β-diketones for the purpose of this invention are those which have at least two halogen atoms, preferably fluorine, attached to the β carbon atom of the selected ketone or ketone analogue and may be described in terms of the generic formula

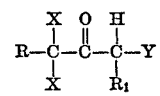

representing a β-diketone compound having from 8-20 carbon atoms, soluble in a specified organic solvent where R is an alkyl or aralkyl group branched or unbranched; X is a halogen; $R_1$ is H or alkyl; and Y is a moiety selected from the group

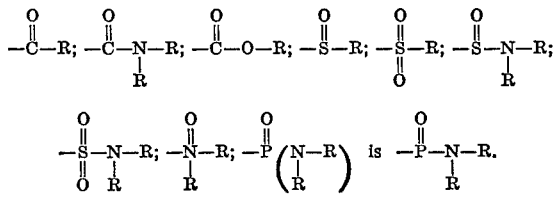

Examples of effective β-diketones of the defined class include 1,1,1-trifluoro-5,5-dimethyl - 2,4 - hexanedione, 1,1,1,2,2 - pentafluoro - 6,6 - dimethyl - 3,5 - heptanedione, and 1,1,1,2,2,3,3-heptafluoro - 7,7 - dimethyl-4,6-octanedione (HFDMOD).

The acidic characteristics of a selected β-ketone are, in general, enhanced by an increasing number of halogen atoms with the two fluorines attached to the carbon atom adjacent to one of the ketone groups having the greatest influence on an increase in acidity of the compound. Additional fluorine or other halongen atoms exhibit a successive decrease in their incremental effect.

The second effective component of the organic phase is a Lewis-base solvating ligand which is more basic than water of the type disclosed in U.S. Pat. No. 3,479,-147. The preferred ligand is trioctylphosphine oxide. The concentration of the solvating ligand in the organic phase is not critical, although it must be great enough to provide two molecules of ligand per molecule of lithium to be extracted.

The organic diluent may be any aliphatic or aromatic liquid capable of dissolving the selected fluorinated β-diketone and the solvating ligand. Typical of the useful diluents are the straight-chain hydrocarbons as exemplified by dodecane, n-octane and purified kerosene fractions and liquid aromatic hyrocarbons such as represented by benzene, p-xylene, and toluene.

The lithium values may be removed from the organic phase by separating the organic and aqueous phases and contacting the separated organic phase with an acidic aqueous solution. Any mineral acid may be used, and the choice may be determined by the desire to avoid certain anions in the resulting lithium-containing aqueous phase. Typically useful acids are HCl, $HNO_3$, $H_2SO_4$, and $H_3PO_4$. The acid concentration may be in the range to provide a pH of 2 or less in the aqueous strip solution after it has been contacted with the organic phase.

EXEMPLARY EMBODIMENT OF THE INVENTION

The experimental procedure we used to determine extraction data include an initial equilibration of the organic and aqueous phases while adjusting to a constant pH value with an appropriate alkali hydroxide. After a constant pH was achieved, the equilibrium was continued for about 30 minutes, the aqueous and organic phases were separated, and the lithium was stripped from the organic. Extraction can also be conducted by countercurrently contacting the aqueous and organic phases. The determination of lithium and other alkali metals was made by flame spectrophotometric techniques.

Figure 2:
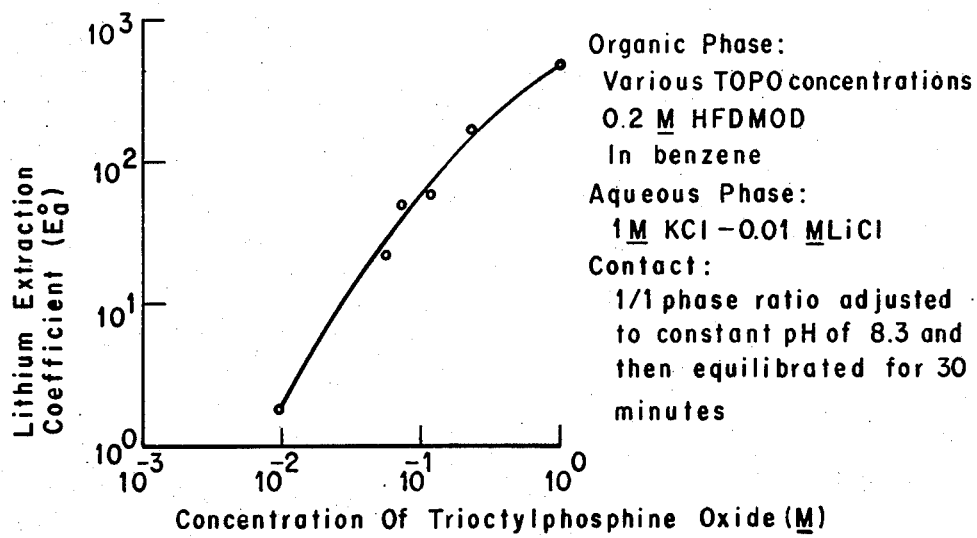
Figure 3:
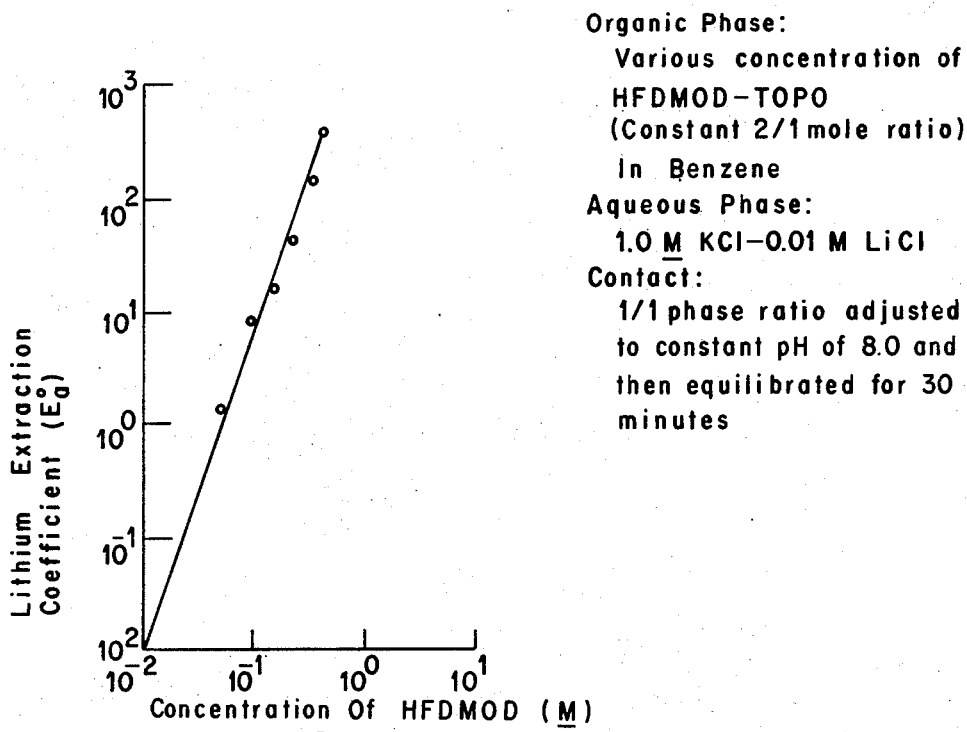

The effectiveness of the defined class of β-ketones and Lewis-base solvating ligands in the extraction of lithium may be seen from the curves shown in FIGS. 1, 2 and 3, where FIG. 1 is a curve showing a plot of lithium extraction coefficient vs. equilibrium pH, where $E_a°$ is defined as the ratio of the molar concentration (C) of the solute in the organic phase to its molar concentration in the aqueous phase at equilibrium: $(E_a° = C_{organic}/C_{aqueous})$; FIG. 2 is a curve showing the effect of solvating ligand concentration on the lithium extraction coefficient where a preferred lithium extractant, HFDMOD, was used in combination with an organophosphorous ligand, trioctylphosphine oxide (TOPO); and FIG. 3 is a curve showing the effect on the lithium extraction coefficient with varying concentrations of HFDMOD.

Referring to FIG. 1, curves 1, 2 and 3 display the efficacy of the fluorinated β-diketones in extracting lithium from neutral and near-neutral solutions as against the extraction power of nonfluorinated β-diketones. It is seen that the extraction coefficient increases over the pH range of 4–9 as the number of fluorine atoms in the β-diketone increases. Thus, at a pH of 7, the use of HFDMOD as the preferred lithium chelating agent, exhibits an extraction coefficient of 20, whereas dibenzoylmethane displays an extraction coefficient lower by more than three orders of magnitude, less than 0.01. FIG. 2 shows that the lithium extraction coefficient will increase with increasing amounts of solvating ligand using trioctylphosphine oxide (TOPO) as representative. FIG. 3 is a log-log plot with a slope of 3, indicating a combining ratio of up to three molecules of HFDMOD per atom of extracted lithium. It shows that usefully high extraction coefficients can be obtained at HFDMOD concentrations in the range 0.1 to less than 1 M. However, saturation loading tests indicate that combining ratios of 1 mole of HFDMOD per mole of extracted lithium can be used when the alkali metal salt in the aqueous phase is either lithium chloride or sodium chloride, and that 2 moles of HFDMOD per mole of extracted lithium can be used when the alkali metal salts are potassium, rubidium or cesium chloride.

The selectivity of HFDMOD for lithium over other alkali metals was determined by contacting an organic phase (0.2 M HFDMOD+0.1 M TOPO+benzene) with 3 equal volume portions of 1 M alkali metal chloride solution containing 0.1 M LiCl. The lithium was stripped with 0.15 N HCl.

| Alkali metal | Separation factor $E_a°$ for Li/$E_a°$ for alkali metal |
|---|---|
| Sodium | 1,300 |
| Potassium | 3,800 |
| Rubidium | 3,700 |
| Cesium | 2,500 |

It is seen that the separation factors are sufficiently distinct as to allow clean-cut separation of lithium.

Distribution losses of 0.2 M HFDMOD—0.1 M TOPO—benzene solution to a 1 M NaCl aqueous solution were determined at an equilibrium pH of 8.0. The aqueous/organic phase ratio was varied from 1 to 100, and the concentration of the HFDMOD remaining in the organic measured after a 30-minute contact. The distribution loss was determined to be less than 5 p.p.m.

Samples of an organic solution containing 0.28 M HFDMOD, 0.14 M TOPO, and 0.98 g. of Li per liter were contacted with various concentrations of hydrochloric acid at 1/1 phase ratio. Complete stripping of the lithium requires only acid equivalent to the lithium content of the organic.

Recycle characteristics of HFDMOD-TOPO solutions were excellent. Lithium extraction coefficients were determined using organic solutions previously stripped with HCl and found to be equal to or greater than those of the first cycle extraction.

In summary, we have described a selected class of halogenated β-diketones which in combination with a defined class of Lewis-base solvating ligands permit an efficient solvent extraction process for the separation of lithium from neutral and near-neutral aqueous brines containing lithium alone or in admixture with other alkali metals.

What is claimed is:

1. A method of separating lithium values from a neutral to near-neutral aqueous solution containing lithium and other alkali metal values which comprises contacting said solution with a substantially water-insoluble organic phase consisting essentially of a beta diketone selected from the group consisting of 1,1,1-trifluoro-5,5-dimethyl-2,4-hexanedione, 1,1,1,2,2 - pentafluoro-6,6-dimethyl-3,5-heptanedione, and 1,1,1,2,2,3,3-heptafluoro-7,7-dimethyl-46-octanedione, a Lewis-base solvating ligand consisting of trioctylphosphine oxide, and an organic diluent for said ketone and Lewis base under such conditions as to effect selective transfer of lithium to the organic phase, and thereafter selectively stripping lithium from the organic phase with an acidic aqueous solution.

References Cited

UNITED STATES PATENTS 3,479,147  11/1969  Lee  23—312 AH
3,700,416  10/1972  Lucid  23—312 ME

FOREIGN PATENTS 895,676  5/1962  Great Britain  23—312 ME

OTHER REFERENCES

ORNL–4272, Ferguson et al., September 1968, p. 175. Copy 23–312 ME.

J. Inorg. and Med. Chem., vol. 30, 1968, Lee et al., pp. 2807 to 2821. Copy 23–312 AH.

WILBUR L. BASCOMB, JR., Primary Examiner

S. J. EMERY, Assistant Examiner

U.S. Cl. X.R.

260—586